US009249001B2

(12) United States Patent
    Lalesse (10) Patent No.: US 9,249,001 B2
(45) Date of Patent: Feb. 2, 2016

(54) UNIVERSAL LOAD-LIFTING MEANS FOR THE PALLETLESS HANDLING OF GOODS TO BE LOADED ONTO PALLETS

(71) Applicant: SSI Schafer Noell GmbH Lager-und Systemtechnik, Giebelstadt (DE)

(72) Inventor: Rob Lalesse, Zevenaar (NL)

(73) Assignee: SSI Schaäfer Noell gmbH Lager- und Systemtechnik, Giebelstadt (DE)

( * ) Notice: Subject to any disclaimer, the term of this patent is extended or adjusted under 35 U.S.C. 154(b) by 337 days.

(21) Appl. No.: 13/912,317

(22) Filed: Jun. 7, 2013

(65) Prior Publication Data
    US 2014/0023462 A1    Jan. 23, 2014

Related U.S. Application Data

(63) Continuation of application No. PCT/EP2011/072133, filed on Dec. 7, 2011.

(30) Foreign Application Priority Data

Dec. 9, 2010  (DE) .......................... 10 2010 054 968

(51) Int. Cl.
    *B65G 1/04*    (2006.01)
    *B66F 9/19*    (2006.01)
    *B65G 1/06*    (2006.01)

(52) U.S. Cl.
    CPC ................ *B66F 9/19* (2013.01); *B65G 1/0407* (2013.01); *B65G 1/0435* (2013.01); *B65G 1/06* (2013.01)

(58) Field of Classification Search
    CPC .................................................. B65G 1/0435

USPC ................................................... 414/278, 280
    See application file for complete search history.

(56) References Cited

U.S. PATENT DOCUMENTS 2,647,647  A      8/1953   Mihai
    2,847,131  A      8/1958   Miller
    5,238,100  A *    8/1993   Rose et al. ................. 198/468.6
    5,292,218  A      3/1994   Ikenouchi et al.
    7,344,348  B2*    3/2008   Freudelsperger ............ 414/278
    7,686,560  B2*    3/2010   Laurin et al. .................. 414/278
    8,047,756  B2*   11/2011   Tuffs et al. .................... 414/392
    2005/0063801 A1*  3/2005   Durand et al. ................ 414/268

(Continued)

FOREIGN PATENT DOCUMENTS

DE      1781 068   A1   12/1970
    DE      30 03 628  A1    8/1981

(Continued)

OTHER PUBLICATIONS

International Preliminary Report on Patentability to corresponding Application No. PCT/EP2011/072133 dated Jun. 13, 2013.

*Primary Examiner* — James Keenan
(74) *Attorney, Agent, or Firm* — Renner, Otto, Boisselle & Sklar, LLP (57) ABSTRACT

A universal load-handling device to be used with an industrial truck comprising a longitudinal support fixable in a transverse direction to a lifting carrier in a transversally displaceable manner by a longitudinal-support drive; a plurality of prongs and a plurality of linear conveyors respectively assigned to the prongs, wherein the linear conveyors protrude vertically over the prongs, in order to carry the loading goods on the linear conveyors and to move the loading goods in the transverse direction relative to the prongs; and wherein the prongs are supported on the longitudinal support by a width-adjustment drive so that they are displaceable longitudinally.

13 Claims, 7 Drawing Sheets

(56) References Cited

U.S. PATENT DOCUMENTS

2005/0095093 A1 5/2005 Hansl
2006/0099055 A1 5/2006 Stefani

FOREIGN PATENT DOCUMENTS

| DE | 42 23 646 A1 | 2/1993 |
|---|---|---|
| DE | 198 01 856 A1 | 7/1999 |
| DE | 200 12 197 U1 | 2/2001 |
| EP | 1 637 476 A2 | 3/2006 |
| JP | 59207304 A | 11/1984 |
| JP | 61 183034 A | 8/1986 |
| WO | 03/070607 A1 | 8/2003 |
| WO | 2005/000718 A1 | 1/2005 |
| WO | 2010/090515 A1 | 8/2010 |

* cited by examiner

UNIVERSAL LOAD-LIFTING MEANS FOR THE PALLETLESS HANDLING OF GOODS TO BE LOADED ONTO PALLETS

CROSS REFERENCES TO RELATED APPLICATIONS

This is a continuation application of the international application WO 2012/076624 A1 (PCT/EP2011/072133), filed on December 2011 and designating the U.S., which international application patent application claims priority of the German patent application DE 10 201 0 054 968.1, filed on Dec. 9, 2010. Both priority applications are fully incorporated by reference herewith.

BACKGROUND OF THE INVENTION

The present invention relates to a universal load-handling device to be used with a (ground-based) industrial truck, particularly a storage and retrieval device, for picking up or delivering pallet-loading goods, in a palletless manner, from a transfer space or to a transfer space, in particular a rack-storage space, wherein each of the loading goods typically weighs up to 500 to 1500 kg, or is heavier. The invention further relates to a method for palletlessly picking up pallet-loading goods from a transfer space by means of the universal load-handling device.

RELATED PRIOR ART

The document WO 2010/090515 A1 discloses a method for picking different piece goods, which are collected in accordance with a picking order. The piece goods are stored individually in a warehouse on comb-shaped shelves. The piece goods are provided in a multiple-deep manner on the shelves of a rack. A storage and retrieval device, which stores and retrieves the piece goods, comprises two spaced apart load-handling devices, which are configured for picking up multiple piece goods, in particular rows of piece goods. The load-handling devices typically comprise respectively three prongs, which are extendable in a transverse direction and which are spaced to each other such that the prongs can be inserted into valleys of the comb-shaped shelves for reaching beneath stored piece goods. The prongs are supported in U-shaped profiles, which in turn are mounted fixedly to a lifting platform of the storage and retrieval device. The distance of the valleys of the comb-shaped shelves determines the distance of the prongs and the U-shaped profiles. Belt conveyors are provided on vertical legs of the U-shaped profiles, the belt conveyors protruding slightly over the vertical U-shaped legs. If one of the piece goods is to be conveyed from the shelf onto the belt conveyors by means of the prongs, the prongs are inserted in transverse direction, after the load-handling device is slightly lifted by means of the storage and retrieval device. The prongs are arranged lower than the belts. As soon the piece good abuts against the front face of the belts, the belts are activated, in order to pull the piece good from the prongs onto the belts. For this purpose, a corresponding sensor is provided in the region of the front faces of the belts, the sensor detecting an approaching piece good positioned on the prong. A relative lift between the prongs and the belts does not exist.

Although the comb-shaped solution is perfectly suitable for picking up and delivering separate (smaller) piece goods, the solution is not suitable for bigger and heavier loading goods such as pallet-loading goods, since the prongs are extended almost over their entire length, which, by the way, corresponds to the U-shaped profiles on the lifting platform and to the length of the lifting platform itself. The torques occurring under these circumstances can no longer be borne by the prongs alone, for example, if a stack of wooden planks, having a weight of e.g. 750 kg, is to be stored or retrieved.

Therefore, it is an object to provide a universal load-handling device, which is suitable for handling pallet-loading goods, particularly if no pallets (load supports) are used at all. Preferably, the load-handling device is to be adapted to different loading goods having different base areas and different allowable contact points for lifting the loads.

SUMMARY OF THE INVENTION

Further, it is an object to provide a method for palletlessly picking up pallet-loading goods from a transfer space (e.g., a transfer space for pick up/delivery) by means of a universal load-handling device.

According to a first aspect of the invention it is disclosed a universal load-handling device to be used with an industrial truck, in particular a storage and retrieval device, for picking up and delivering loading goods, which are to be loaded on a pallet, from a transfer space or to the transfer space, particularly from or to a rack-storage space, wherein the loading good is heavy and lowered to the transfer space or lifted by means of a hoist unit of the industrial truck from the transfer space for the purpose of storage or retrieval, comprising: a longitudinal support, which is substantially oriented in a longitudinal direction and which is fixable in a transverse direction to a lifting carrier of the industrial truck in a transversally displaceable manner by means of a longitudinal-support drive; a plurality of prongs, which are substantially oriented in the transverse direction and which are supported on the longitudinal support in a transversally displaceable manner by means of a prong drive, in order to extend and retract the prongs in the transverse direction relative to the longitudinal support; and a plurality of linear conveyors which are substantially oriented in the transverse direction, wherein respectively one of the linear conveyor is assigned to one of the prongs, wherein the linear conveyors are moved by means of a linear-conveyor drive, and wherein the linear conveyors protrude vertically over the prongs, in order to carry the loading goods on the linear conveyors and to move the loading goods in the transverse direction relative to the prongs; wherein the prongs are supported on the longitudinal support in the longitudinal direction by means of a width-adjustment drive in a manner so that they are displaceable longitudinally to each other. In particular, the plurality of prongs comprises a pair of longitudinally displaceable outer prongs, wherein multiple inner prongs are arranged between the outer prongs, wherein at least one of the inner prongs is longitudinally displaceable. Alternatively, at least three prongs of the plurality of prongs could be longitudinally displaceable.

According to a second aspect of the invention it is disclosed a universal load-handling device to be used with an industrial truck having a hoist unit and a lifting carriage for picking up and delivering loading goods, which are to be loaded on a pallet, from a transfer space or to the transfer space, wherein the loading goods are heavy and wherein the loading goods are lowered to the transfer space or lifted from the transfer space by means of the hoist unit of the industrial truck for storage or retrieval purposes, the load-handling device comprising: a longitudinal-support drive; a longitudinal support, which is substantially oriented in a longitudinal direction and which is fixed in a transverse direction to the lifting carriage of the industrial truck in a transversally displaceable manner by means of the longitudinal-support drive; a prong drive; a plurality of prongs, wherein each of the prongs is substantially oriented in the transverse direction and supported on the longitudinal support in a transversally displaceable manner by means of the prong drive, in order to extend and retract the prongs in the transverse direction relative to the longitudinal support; a linear-conveyor drive; and a plurality of linear conveyors which are substantially oriented in the transverse direction, wherein respectively one of the linear conveyor is assigned to one of the prongs, wherein the linear conveyors are moved by means of the linear-conveyor drive, and wherein the linear conveyors are configured to protrude vertically across the prongs, in order to carry the loading goods on the linear conveyors and to move the loading goods in the transverse direction relative to the prongs; wherein the prongs are supported on the longitudinal support in the longitudinal direction by means of a width-adjustment drive in a manner so that they are displaceable longitudinally to each other.

A big advantage of the invention is that loading goods, which are normally stored as units on pallets, can be handled without load supports, in particular in a palletless manner, by industrial trucks such as storage and retrieval devices by means of a suitably equipped load-handling device. The load-handling device is formed such that it can reach beneath an arbitrarily selectable point beneath the loading good for lifting and transferring the loading good. Fixedly preset contact points, as defined, for example, for Europool pallets, are not required with the present invention for handling the loading goods, which might be bulky and heavy. In order to achieve this goal the prongs are adjustable in a longitudinal direction of the industrial truck. The operator of the industrial truck can define a position beneath the loading good, where the prongs get in contact, by means of the control of the industrial truck. This can be different from loading good to loading good. In this sense, the operator is flexible.

In this context, the load-handling device of the invention is dimensioned such that not (only) individual piece goods, which are typically stored on pallets in greater amounts, but pallet-loading good units can be handled. Such loading goods can rapidly weigh up to 1500 kg or more. With such great weights it is difficult to hold the load in a wide overhanging manner, since the tilting moments can rapidly get big in this position. Typical load-handling devices, which are adapted for handling piece goods, cannot support such high loads at all. The corresponding safety regulations are to be considered.

The pick-up or the delivery of the above-described palletless loading goods happens rapidly. While the longitudinal support is extended, both the prongs and the linear conveyors can be operated simultaneously. In this sense, a superposition of three movements in the direction Z occurs. In contrast to the prior art, where the telescopic fork sections are extended sequentially, individually-controllable components (longitudinal support, prongs, and linear conveyors) can be operated simultaneously in the present case.

Preferably, the longitudinal support substantially extends over an entire length of the lifting carriage and is moveable along linear-guiding devices, preferably rails, on the lifting carriage.

Due to the great length of the load-handling device (in the direction X) both very long loading goods and very short loading goods can be handled without problems. Due to the capability of longitudinally displacing the prongs, loading goods, which have different lengths, can all be handled with one and the same load-handling device. If the loading goods are relatively small, occasionally even several laterally arranged loading goods could be handled simultaneously.

With a preferred embodiment the prongs are moveable in the longitudinal direction such that the prongs can be moved substantially to any arbitrary point beneath the loading good which is provided for pick-up or delivery.

This feature expresses the flexibility of the handling of the loading goods.

Further, it is preferred to provide the prongs in pairs.

Prongs provided in pairs increase the contact area between the load-handling device and the to-be-moved loading goods. The surface pressure in the region of the contact positions is reduced. Damages to the loading goods due to "selective" bearing pressure are less likely.

With another preferred embodiment one prong, which is arranged centrally in the longitudinal direction, is rigidly mounted to the longitudinal support, and outer prongs are displaceable in the longitudinal direction in pairs by means of respectively one common width-adjustment drive symmetrically relative to the centrally arranged prong, wherein such prong pairs, which are displaceable in pairs, preferably are coupled to each other, respectively by means of a spindle (or a chain, a pinion, a cylinder, or the like) so that prong pairs, which are displaceable in pairs, are guided along their respective spindle.

This embodiment is advantageous in that the prongs are symmetrically adjustable relative to the prong, which is centrally arranged in a rigid manner. As a result, prong pairs can be formed, which in turn can be adjusted by means of one common drive. Consequently, the number of the drives required for adjusting the prongs to each other in the longitudinal direction is reduced. If spindles are used for driving purposes, the spindles can simultaneously serve as linear-guiding devices.

With another embodiment each of the linear conveyors can comprise a closed traction device, or conveying device, which runs endlessly around one of the prongs by means idler pulleys, which are respectively supported in the one of the prongs, and which mechanically couples the linear conveyor to the one of the prongs so that the traction device moves together with the one of the prongs during retraction or extension.

Hence, the movement of the prong also drives the traction device of the linear conveyors (e.g., belts, chain, rope, etc.) in this manner. With other words, this means that the traction device of the linear conveyors does not need to be driven actively for achieving displacement of the loading goods resting thereon. Under certain circumstances, linear-conveyor drive can be omitted completely.

Further, it is advantageous if the linear-conveyor drive comprises a drive unit and a drive shaft, wherein the drive shaft is supported in the longitudinal support.

Preferably, one single drive shaft is provided, which drives each of the linear conveyors. In this manner it is possible to drive the linear conveyors synchronously. Loading goods, which are positioned on the linear conveyors, are then moved in parallel to the direction Z during storage or retrieval of the loading goods. Rotation of the loading goods on the load-handling device is avoided in this manner. The loading goods are stored or retrieved in default orientations. This allows increase of the storage density by reducing the distance between stored loading goods.

In particular, a prong-drive shaft of the prong drive is supported in the longitudinal support. Also in this case one single drive shaft can synchronously drive each of the prongs with regard to a movement in the direction Z. The number of the required prong drives can be reduced to one. The movement of the prongs occurs synchronously. The advantages described above with reference to the linear conveyors can be achieved in the present case as well.

Further, it is preferred that the prong drive comprises a gear sitting on the prong-drive shaft, which is supported in the longitudinal support and meshes with a gear-tooth profile provided at a bottom side of each of the prongs.

According to a third aspect of the invention it is disclosed a storage and retrieval device having a hoist unit and a lifting carriage, wherein a load-handling device in accordance with the invention is mounted to the lifting carriage.

According to a fourth aspect of the invention it is disclosed a storage and retrieval device having a hoist unit and a lifting carriage, wherein a load-handling device is mounted on the lifting carriage, the load-handling device comprising: a longitudinal-support drive; a longitudinal support, which is substantially oriented in a longitudinal direction and which is fixed in a transverse direction to the lifting carriage of the industrial truck in a transversally displaceable manner by means of the longitudinal-support drive; a prong drive; a plurality of prongs, wherein each of the prongs is substantially oriented in the transverse direction and supported on the longitudinal support in a transversally displaceable manner by means of the prong drive, in order to extend and retract the prongs in the transverse direction relative to the longitudinal support; a linear-conveyor drive; and a plurality of linear conveyors which are substantially oriented in the transverse direction, wherein respectively one of the linear conveyor is assigned to one of the prongs, wherein the linear conveyors are moved by means of the linear-conveyor drive, and wherein the linear conveyors are configured to protrude vertically across the prongs, in order to carry the loading goods on the linear conveyors and to move the loading goods in the transverse direction relative to the prongs; wherein the prongs are supported on the longitudinal support in the longitudinal direction by means of a width-adjustment drive in a manner so that they are displaceable longitudinally to each other.

According to a fifth aspect of the invention it is disclosed a warehouse system having a rack, a storage and retrieval device, and a conveyor, wherein the storage and retrieval device is equipped with a load-handling device in accordance with the invention and is moveable in the longitudinal direction along the rack in horizontal and vertical directions for transferring pallet-loading goods, in a palletless manner, between rack-storage spaces and the conveyor, which is arranged adjacent to the rack.

According to a sixth aspect of the invention it is disclosed a method of palletlessly picking up one loading good, which is to be loaded to a pallet, from a transfer space by means of a universal load-handling devices, which is preferably formed in accordance with the invention, wherein the method comprises the steps of: positioning the load-handling device in a longitudinal direction and a height direction in front of a transfer space; positioning the prongs in the longitudinal direction by means of a width-adjustment drive so that the prongs can reach beneath any point under the loading goods; extending the longitudinal support and/or the prongs in a transverse direction until the loading goods are sufficiently supported; moving the load-handling device in the height direction such that the loading goods are lifted from the transfer space; and retracting the longitudinal support and/or the prongs in the transverse direction until the loading goods are in a transport position.

According to a seventh aspect of the invention it is disclosed a method for palletlessly picking up loading goods, which are to be loaded on a pallet, from a transfer space by means of a universal load-handling device comprising: a longitudinal-support drive; a longitudinal support, which is substantially oriented in a longitudinal direction and which is fixed in a transverse direction to the lifting carriage of the industrial truck in a transversally displaceable manner by means of the longitudinal-support drive; a prong drive; a plurality of prongs, wherein each of the prongs is substantially oriented in the transverse direction and supported on the longitudinal support in a transversally displaceable manner by means of the prong drive, in order to extend and retract the prongs in the transverse direction relative to the longitudinal support; a linear-conveyor drive; and a plurality of linear conveyors which are substantially oriented in the transverse direction, wherein respectively one of the linear conveyor is assigned to one of the prongs, wherein the linear conveyors are moved by means of the linear-conveyor drive, and wherein the linear conveyors are configured to protrude vertically across the prongs, in order to carry the loading goods on the linear conveyors and to move the loading goods in the transverse direction relative to the prongs; wherein the prongs are supported on the longitudinal support in the longitudinal direction by means of a width-adjustment drive in a manner so that they are displaceable longitudinally to each other, comprising the steps of: positioning the load-handling device in the longitudinal direction and a height direction in front of a transfer space; positioning the prongs in the longitudinal direction by means of a width-adjustment drive so that the prongs reach beneath a freely selectable point under the loading goods; extending the longitudinal support and/or the prongs in a transverse direction until the loading goods are sufficiently supported; moving the load-handling device in the height direction such that the loading goods are lifted from the transfer space; and retracting at least one of the longitudinal support and the prongs in the transverse direction until the loading goods are in a transport position.

Further, it is preferred to move the linear conveyors during the retraction of the longitudinal support and/or the prongs such that the loading goods are moved oppositely to the retraction direction of the longitudinal support and/or the prongs.

In this manner, it is possible to save time since the movements occur simultaneously.

It is clear that the above mentioned and hereinafter still to be explained features cannot only be used in the respectively given combination but also in other combination or alone, without departing from the scope of the present invention.

BRIEF DESCRIPTION OF THE DRAWINGS

Embodiments of the invention are depicted in the drawings and will be explained in more detail in the following description, wherein.

DESCRIPTION OF PREFERRED EMBODIMENTS

The orientation directions have been selected in accordance with the terms typically used in intralogistics within the description below so that the (horizontal) length along a longitudinal side of a rack is designated by X, the depth of a rack is designated by Z, and the (vertical) height of a rack is designated by Y. The so-defined reference system, which is substantially used with storage and retrieval devices, will also be applied in the following to its load-handling device.

In the following description of the figures the load-handling device (hereinafter also briefly designated as "LHD") in accordance with the invention will always be designated by the reference numeral 10, independent of the embodiment.

The LHD 10 can be part of a (ground-based) industrial truck, which is capable of picking up or delivering a storage unit. Storage units are handling units (e.g., pallets, containers, trays, cartons, etc.) which are used in a storage region. Typically, one storage unit holds articles of one type only (e.g., a pallet having a plurality of identical piece goods, which are stored in terms of a stack of piece goods). However, the storage units can also be mixed ("mixed pallets"). Typically, the storage units include the articles as well as load supports. Alternatively, the load supports are also called load carriers, and thus represent a supporting device for collecting articles, or goods, in order to form one loading unit, or one loading good. Load carriers are, strictly speaking, supporting load carriers, which support loading goods only from beneath. Known examples of load carriers are flat pallets such as Europool pallets. The present invention can also be used without load carriers so that the loading goods can be handled without load supports ("palletlessly") by means of the LHD 10.

Conventional load-handling devices for handling pallet-loading goods, which are provided on a pallet, are telescopic forks, for example. A telescopic fork includes a number of fork sections, which are interlaced and which can be extended for achieving a great handling depth. However, the telescopic fork requires contact points, which are exactly defined, and openings on, or in, the load carrier such as a Europool pallet for moving the Europool pallet.

An industrial truck is a moveable conveying device, which is used for horizontal and vertical internal transportation of loading goods. If the industrial truck is operated in a ground-based manner, i.e. drives on the ground, it is called a ground-based industrial truck. If the industrial truck is mounted to a ceiling, or, for example, to a steel construction having legs, it is called a ground-free industrial truck. The present invention can be used with both ground-based and ground-free industrial trucks, but in particular with storage and retrieval devices and shifting cars.

A storage and retrieval device (also called "rack servicing unit") is typically ground-based and usually rail-guided, for example, in order to retrieve loading goods from a rack or store the loading goods into the rack. The storage and retrieval device can be moved longitudinally in a rack aisle (in a rail-guided manner) in a horizontal direction between two adjacently arranged racks. The storage and retrieval device comprises a travel unit, one or more masts, at least one hoist unit, a lifting platform or a lifting carriage, as well as a load-handling device. The hoist unit allows the lifting platform to travel vertically along the one or more masts, while the storage and retrieval device travels horizontally in the longitudinal direction X of the rack by means of the travel unit. The load-handling device is mounted to the lifting platform, which can also be formed in terms of a frame, the load-handling device allowing storage and retrieval of the loading goods. For this purpose, the load-handling device is moveable at least in the transverse direction Z. In the following, one spatially speaks of a "transfer space", where such an action happens independent of whether delivery or pick-up of one loading good occurs.

The LHD 10 of the present invention is adapted to handle so-called "pallet-loading goods" in a palletless manner. Pallet-loading goods are to be understood as loading goods (or the loads), which are typically stored and transported on a pallet in terms of a compact and secured unit. In this way, for example, several cartons can be foil-welded to form a block, which then serves as a compact handling unit. The cartons can be different within the compact handling unit. Such a compact unit is not to be confused with a piece good. Pallet-loading goods can be formed by a plurality of piece goods, which can be of one article type only, but can also be mixed, the piece goods being provided in terms of layers stacked on top of each other to form a stack of piece goods on the pallet. However, individual piece goods, which are not secured, typically are significantly smaller and lighter than one of the pallet-loading goods. If it is referred to loading goods in the following, pallet-loading goods in the above-explained sense are intended. In this context, for example, also a stack of planks can be meant, which is normally stored on a pallet. Bulk material can also be handled, as long as the bulk material is secured in terms of a compact unit (for example, in a bag).

The present invention is used in particular in warehouse systems of furniture dealers, wherein different products are stored stackwise on pallets, in terms of (handling) units, in a disassembled and/or folded state.

Loading goods, which are handled according to the invention, typically have lengths between 400 and 1200 mm. The height can be greater than 2200 mm. The widths are typically between 350 and 2500 mm. Cartons or the like can also represent the loading goods. Feet, which are flexibly attachable beneath the loading goods such as cardboard feet or cardboard wedges, are not considered to represent classical load supports. Classical load supports comprise fixedly defined locations, or regions, where the load-handling device is allowed, or is not allowed, to contact the load support. These predefined regions determine, among other things, a storage-space grid within the rack, since the load-handling device can only store and retrieve the load supports at fixedly predefined positions. This is different with the present invention. The supporting elements (such as feet, wedges, "loading ledges", etc.) can be mounted arbitrarily beneath the loading goods, preferably in a removable manner. In this context, each of the loading goods can be different than the remaining loading goods. The handling of such loading goods, in this term, is not unitary and thus not standardized. Therefore, storage spaces can be defined freely. The storage-space grid is reduced drastically. According to the invention, the dimension of the grid could be 75 mm, for example.

Figure 1:
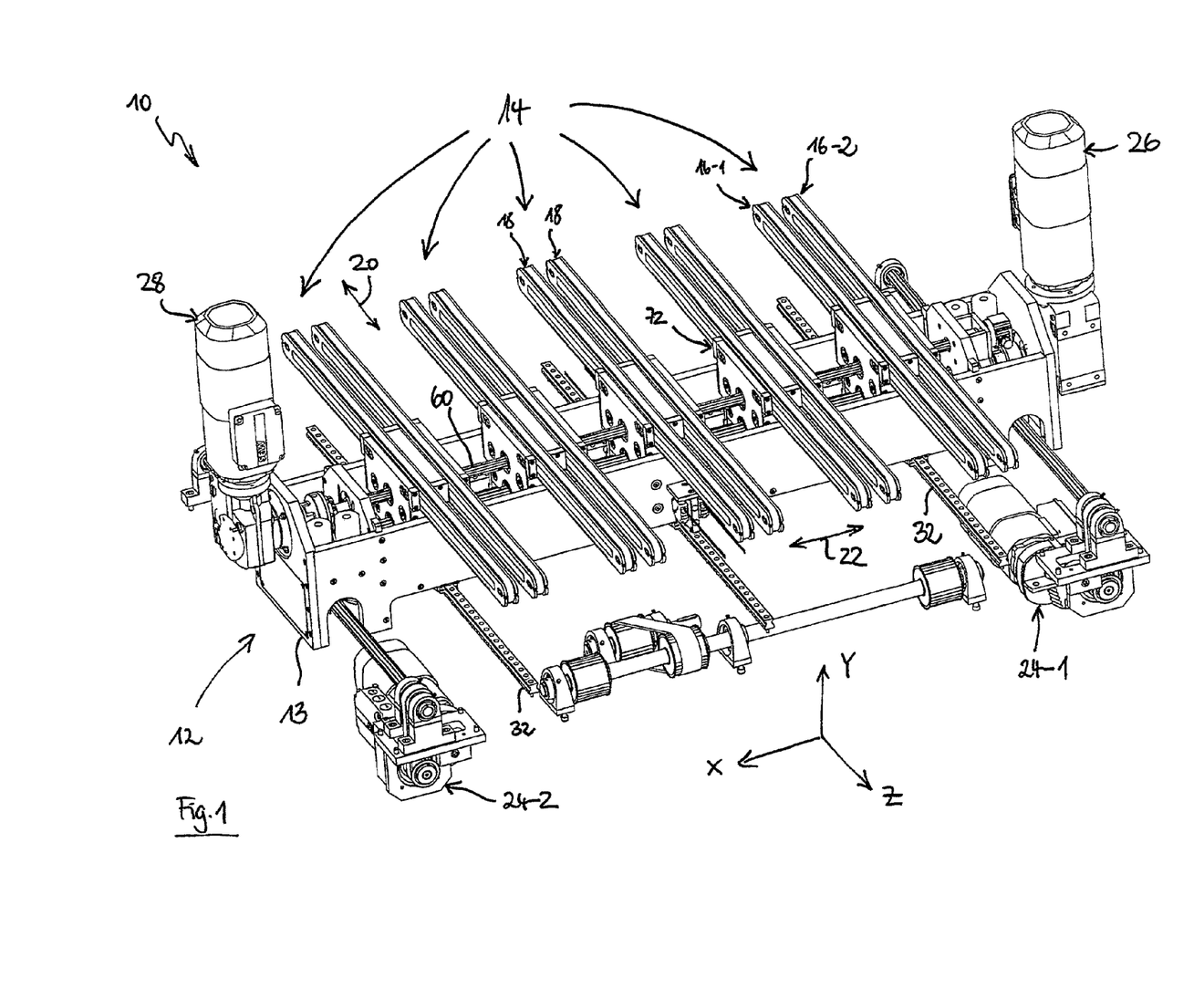
FIG. 1 shows a perspective view of a load-handling device in accordance with the invention.

FIG. 1 shows a perspective view of an LHD 10 of the invention without loading goods. The LHD 10 substantially extends in a longitudinal direction X, and comprises a longitudinal support 12. The longitudinal support 12 is represented exemplarily, in the present case in terms of a tub 13, wherein a plurality of prongs 14 are supported in a longitudinally-displaceable manner in the tub 13, i.e. in parallel to the axis X. In FIG. 1 five prongs 14 are exemplarily shown, which respectively extend substantially in the transverse direction Z. More or less of the prongs 14 can be used. In the following, also prong pairs are referred to as prongs 14, which can comprise several individual prongs, which are arranged directly adjacent to each other and which are assigned to each other. In FIG. 1 each of the prongs 14 exemplarily comprises two individual prongs 16-1 and 16-2, which can be operated as a unit and which have, in the present case, respectively an identical distance to each other in the longitudinal direction X. In this sense, the prongs 14 also have a certain width in the longitudinal direction X. The prongs 14 further comprise at least one linear conveyor 18, respectively. In FIG. 1, one linear conveyor 18 (e.g., sprocket-belt conveyor, belt conveyor, etc.) is respectively assigned to one of the individual prongs 16.

The prongs 14 are supported in a transversally displaceable manner on, or in, the longitudinal support 12, as indicated by means of an arrow 20. The prongs 14 can be extended and retracted in the direction Z, both to the left and to the right.

The prongs 14 are also supported in a longitudinally displaceable manner to each other on, or in, the longitudinal support 12, as indicated by means of a double arrow 22. With one embodiment the prongs 14 can be adjusted individually to each other in the direction X (longitudinal direction). Not all of the prongs 14 need to be longitudinally displaceable. In the following description, for example, the central prong 14 is connected rigidly to the longitudinal support 12 so that only the inner prongs 14 and the outer prongs 14 relative to the central prong 14 are allowed to move in the longitudinal direction X. The capability of the prongs 14 to be displaced longitudinally is achieved by means of a width-adjustment drive 24. In FIG. 1 a first width-adjustment drive 24-1 of the inner prongs 14 (i.e. the second and fourth prongs 14 from the left) and a second width-adjustment drive 24-2 of the outer prongs 14 (i.e., the first and fifth prongs 14) are provided. Then, the inner prongs 14 and the outer prongs 14 can be moved respectively symmetrical relative to the central prong 14 (i.e. the third prong). It is clear that each of the prongs 14 can be provided with a separate width-adjustment drive 24. Symmetrical adjustment is not necessarily required, but it is advantageous with regard to the number of the width-adjustment drives 24 to be used.

The linear conveyors 18, which are preferably supported in each of the prongs 14, can be driven in a forwardly and rearwardly movable manner by means of a linear-conveyor drive 26. Preferably, only one single linear-conveyor drive 26 is provided for each of the linear conveyors 18 of all of the prongs 14. This is advantageous in that the movement of the linear conveyors 18 happens synchronously. Since one loading good is typically carried by each of the prongs 14, a synchronized movement of the linear conveyors 18 is desired.

The prongs 14 in turn can travel both positively and negatively relative to the longitudinal support 12 in the transverse direction Z. This is achieved by means of a prong drive 28, which has a drive shaft 60 preferably extending through the longitudinal support 12 in longitudinal direction X. One or more prong drives 28 can be provided, wherein one single prong drive 28 is preferred, in order to synchronize the transverse movement 20 of the prongs 14 as well.

Figure 2:
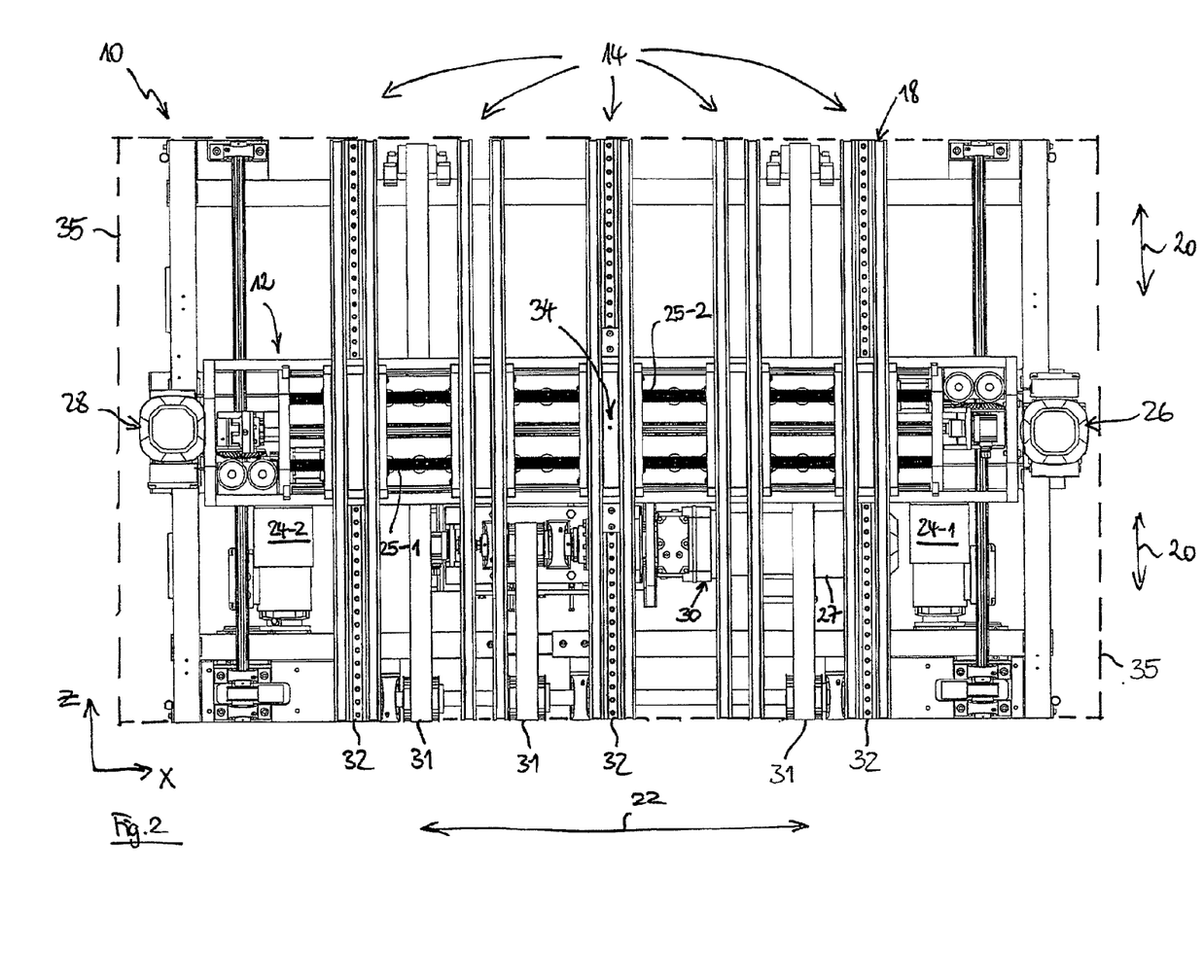
FIG. 2 shows a top view of the load-handling device of FIG. 1.

The longitudinal support 12 can travel by means of a longitudinal-support drive 30, which is not shown in FIG. 1, along linear-guiding devices 32 in the transverse direction Z relative to a lifting carriage 35, which is indicated by means of a dashed line in FIG. 2.

The longitudinal-support drive 30 is not shown in FIG. 2. An output shaft of the longitudinal-support drive 30 is coupled to, for example, one or more sprocket belts 31, which in turn are fixedly connected to the tub 13 and are preferably arranged in outer regions (relative to the center in the direction X). Alternatively, also spindle, chains, cam eccentrics, or the like, can be used instead of the sprocket belt 31. The tub 13 is longitudinally displaceable along one or more of the linear-guiding devices 32. In FIGS. 1 and 2 three linear-guiding devices 32 are exemplarily shown, which extend in the transverse direction Z and which are spaced to each other in the longitudinal direction X almost regularly. Attachment of the load-handling device 10 to the lifting carriage 35 is achieved by means of the linear-guiding devices 32. Typically, the prongs 14 are as long as the lifting carriage 35 is wide. The same applies with regard to the lengths of the linear-guiding devices 32. The entire load-handling device 10, and in particular the longitudinal support 12, substantially extends over a total length of the lifting carriage 35, as indicated in FIG. 2. The width of the lifting carriage 35 almost corresponds to a maximal storage depth (direction Z) within a warehouse, for example, in a rack.

The top view of FIG. 2 further shows two spindles 25 in the region of the tub 13, which are driven by the width-adjustment drives 24. Of course, also other elements such as chains, sprocket belts, or the like, can be used instead of spindles. The first spindle 25-1 can drive, for example, the first and fifth prongs 14 in terms of a pair relative to the third central prong 14 in a longitudinally displaceable manner 22 by means of the first width-adjustment drive 24-1. Then, a second spindle 25-2 can drive the second and fourth prongs 14 in common, i.e. the inner prong pair, by means of the second width-adjustment drive 24-2. However, each of the prongs 14 can also be driven individually.

Thus, there are three components contributing to a movement of one of the loading goods 36 in the direction Z. On the one hand, the longitudinal support 12 can travel in a first plane in the direction Z transversally (to the longitudinal direction X of the industrial truck to which the LHD 10 is attached). The prongs 14 in turn can travel transversally 20 relative to the longitudinal support 12 in a second plane in the direction Z. In a third plane in the direction Z the conveying devices of the linear conveyors 18 can be moved in the transverse direction Z within the prongs 14. These movements are exemplarily shown in more detail in FIG. 3.

FIGS. 3A and 3B show the LHD 10 of FIGS. 1 and 2 in a maximally extended state along the transverse direction Z, in the present case to the left, wherein FIG. 3A shows a side view and FIG. 3B shows a top view. The FIGS. 3C and 3D show a normal position of the LHD 10, where one loading good 36 is positioned centrally to the longitudinal axis of the LHD 10, wherein FIG. 3C a side view and FIG. 3D shows a top view of the normal position. It is clear that the position, which is shown in FIGS. 3A and 3B and which is oriented to the left, can also be achieved in the opposite direction (i.e. to the right). Additionally, any arbitrary position between the normal position and the maximum position can be achieved by means of a correspondingly configured control. In this manner, also multiple piece goods can be stored and retrieved one behind the other in the direction Z.

Figure 3:
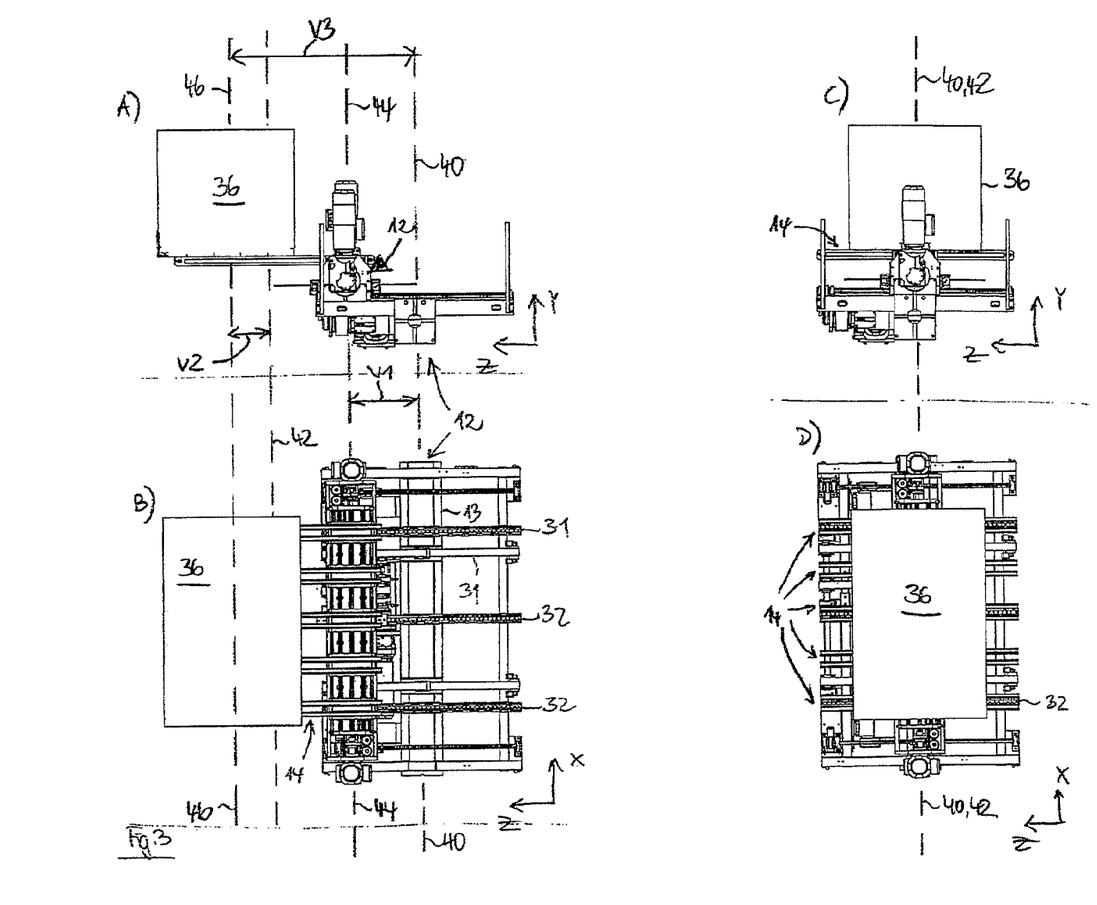
FIG. 3A-3D show a side view and top view of the load-handling device of the FIGS. 1 and 2 (FIGS. 3A and B), which is maximally extended, as well as a side view and top view of the load-handling device in a normal position (FIGS. 3C and D)

In FIG. 3 a central axis 40 of the longitudinal support 12 is shown with reference to the direction Z, the central axis 40 representing an absolute center in the direction Z. Further, a center of the prongs 14 in the direction Z is indicated by means of an auxiliary line 42. By means of the auxiliary lines 44 and 46 it is indicated in FIGS. 3A and 3B that the longitudinal support has reached its outer left end (auxiliary line 44), wherein a center 46 of the loading good 36 is displaced relative to the center 42 of the prongs 14 by means of the linear conveyors 18. The displacement between the center 40 of the LHD 10 and the center 44 of the longitudinal support 12 is designated by V1 in FIG. 3A. The displacement of the center 46 of the loading good 36, which is generated by the linear conveyors 18, relative to the center 42 of the prongs 14 is designated by V2 in FIG. 3A. The entire displacement of the center 40 of the LHD 10 relative to the center 46 of the loading good 36 is designated by V3 in FIG. 3A. V3 corresponds to the sum of V2 and two times V1 (V3=2×V1+V2).

Comparison of FIGS. 3A and 3B with the FIGS. 3C and 3D makes clear that the longitudinal support 12 can be displaced in the direction Z relative to the lifting carriage 35 and the linear-guiding devices 32 attached thereto, the prongs 14 can be displaced in the direction Z relative to the longitudinal support 12, and the conveying device (e.g., belts, chains, apron conveyors, etc.) of the linear conveyors 18 can be displaced in the direction Z within the prongs. The FIGS. 3C and 3D show the loading good 36 in its transportation position on the LHD 10 so that an industrial truck, which is not illustrated in the present case, can travel horizontally and/or vertically, i.e. along the axes X and Y. FIGS. 3A and 3B show a state in which the loading good 36 either has just been picked up or is briefly before its delivery. Both the pick-up and the delivery is performed due to a relative lift along the axis Y by means of the hoist unit of the industrial truck, which is not illustrated in the present case.

As will be explained in more detail below, the linear conveyors 18 are mechanically coupled to the prongs 14, wherein the linear conveyors 18 can also be moved independently of the prongs 14 in the direction Z.

Figure 4:
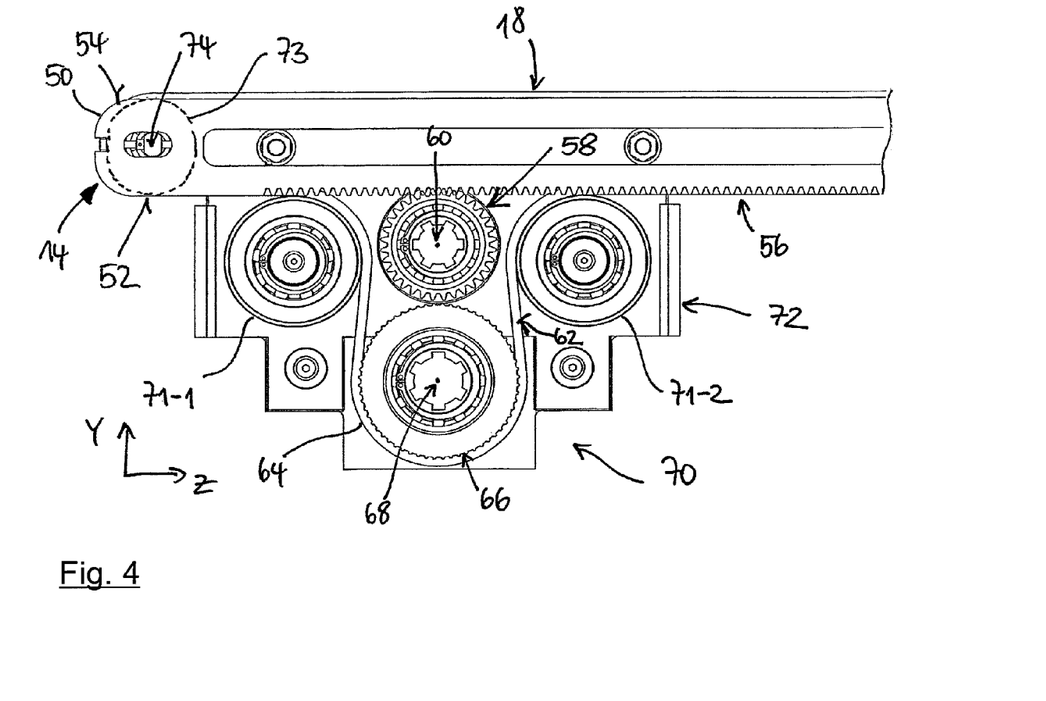
FIG. 4 shows a partial side view of one prong including a prong drive and a linear drive.

FIG. 4 shows a side view where one of the prongs 14 is extended maximally to the right relative to the longitudinal support 12, which in turn is not shown in FIG. 4. The prong 14 is not shown with its entire length, but only partially. The prong 14 can comprise outer lugs 50 (in the direction X) which are spaced to each other by means of bolts 74. The bolts 74 are preferably provided in outer edge regions (in the direction Z) 19 of the prongs 14 and serve as bearings of idler pulleys 73, which can sit on the bolts 74 by means of sockets, ball bearings, etc. The linear conveyor 18 is arranged between the adjacent lugs 50, 52 designate a bottom side of the prong 14, 54 designates a top side of the lugs 50. A gear-tooth profile 56 extends almost over the entire length (in the direction Z) at the bottom side 52 of the prong 14, at least at one of the lugs 50. The gear-tooth profile 56 meshes with a gear 58, which is part of the prong drive 28. The prong drive 28 also includes a drive shaft 60, to which the gear 58 is mounted in a rotatably fixed manner. If the drive shaft 60 rotates, then movement of the prong 14 relative to a base 72 is effected by means of the meshing interlocking of the gear 58 with the gear-tooth profile 56, wherein the drive shaft 60 is rotatably supported in the base 72. The base 72 is the bearing of the prong 14 and is supported in a longitudinally displaceable manner, together with the prong 14, in the tub 13 of the longitudinal support 12. Further, a drive shaft 68 of the of the linear-conveyor drive 26 can be supported rotatably in the base 72, wherein a gear 66 is mounted on the drive shaft 68 in a rotationally fixed manner. The gear 66 does not mesh with the gear 58. The gear 66 meshes with a socket belt 64, which forms the traction device 62 of the linear conveyor 18. Further, additional idler pulleys 71 can be rotatably supported in the base 72, for example, for forming an omega drive 70. It is clear that the linear conveyor 18 can also be moved in the direction Z by means of another type of drive. Further, it is clear that another type of drive can be selected for the prong 14 instead of meshing gears.

However, the prongs 14 can also be worked out of a square profile, wherein preferably the top and/or bottom sides of the square profile comprise a recess, or depression, in the longitudinal direction for receiving and guiding the traction device 62.

The base 72 is part of the longitudinal support 12, wherein the base 72 is mechanically coupled to the longitudinal support 12, for example, by means of the spindles 25. The base 72 can be moved in the longitudinal direction X relative to the tub 13.

The sprocket belt 64 is driven by the gear 66 and guided by the idler pulleys 71 towards the additional idler pulleys 73, which are supported at the outer ends of the prongs 14. Alternatively, a chain having a chain wheel, or the like, can be used as well.

If the prong 14 is driven back from the position shown in FIG. 4 to the central position in accordance with FIGS. 3C and 3D, then one ends up in a position according to FIG. 5A which will be referred to below. FIG. 5B shows the overall state of FIG. 4.

Figure 5:
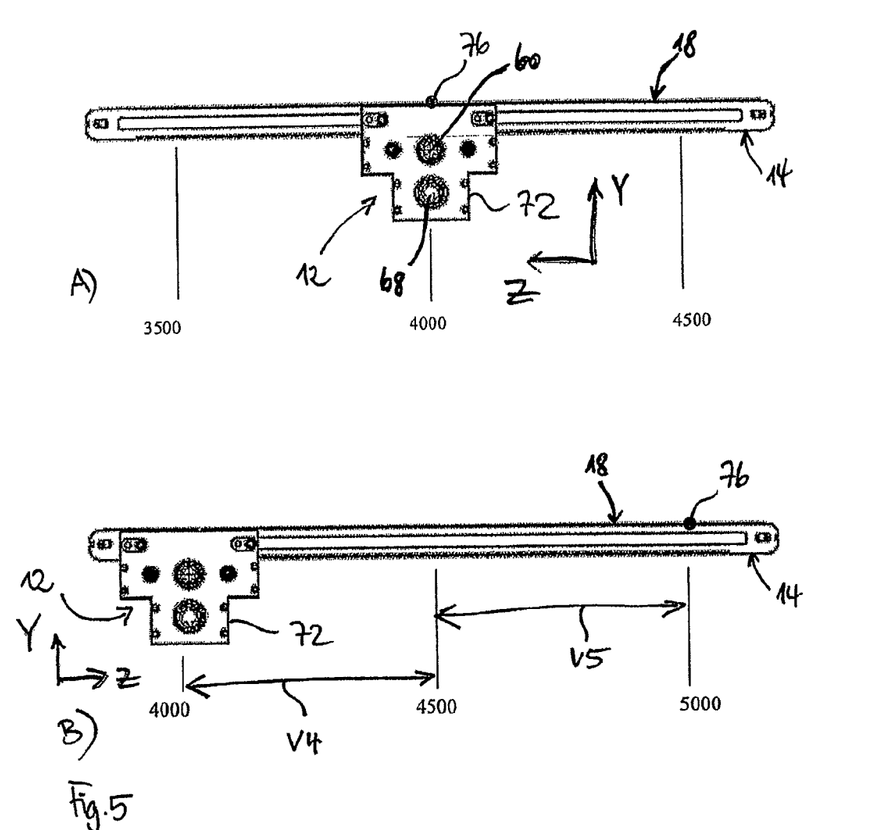
FIG. 5A-5B show the prong of FIG. 4 in a normal position (FIG. 5A) and in a maximally extended position (FIG. 5B)

FIG. 5 is used for showing that one loading good 36, which is positioned on the linear conveyor 18, is displaced double way in comparison to the prong 14, even if the linear conveyor 18 is not driven actively, i.e. rests. This is to be attributed to the mechanical coupling of the prong 14 to the linear conveyor 18 by means of the traction device 62. If the prong 14 moves relative to the longitudinal support 12 (cf. displacement V4 in FIG. 5B), then a reference point 76 on the traction device 62 travels a corresponding path in an opposite direction (cf. displacement V5 in FIG. 5B).

Figure 6:
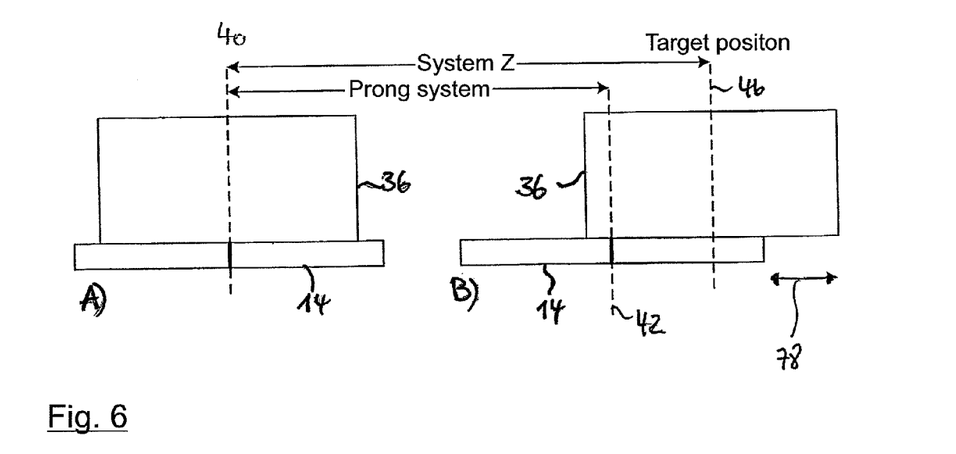
FIG. 6 shows one prong, which is schematically illustrated, in a normal position (FIG. 6A) including loading goods and in a maximally extended position (FIG. 6B)

In dependence on a length of the prong 14 (in the direction Z) a countermovement needs to be initiated by means of the linear-conveyor drive 26 in order to prevent that the loading good 36 gets such a great overhang 78, as exemplarily depicted in FIG. 6B, so that the loading good 36 falls off the prong 14. It is clear that this condition heavily depends on the dimensions and the weight distribution of the loading good 36. The dimension and the weight distribution of the loading good 36 determine the position of the center of gravity of the loading good 36. Hence, if the displacement of the prong 14 alone causes an overhang 78, which leads to a risk of crash, the linear-conveyor drive 26, and thus the drive shaft 68 thereof, can be operated actively so that the reference point 76 in the extended state of the prong (cf. FIG. 5B) is positioned further to the inside, i.e. closer to the center 42 of the prong 14. Typically, the dimensions and the weight of the loading good 36 are determined in advance at so-called identification points of the overall system, e.g., at the goods receipt, and are recorded in a (superordinated) control so that, for example, a stored-program controller (SPC) being responsible for the control of the LHD 10 can be fed with the relevant information at any time. The linear-conveyor drive can, of course, also assist the actual movement, i.e. can be oriented identically to the movement of the prong 14.

Figure 7:
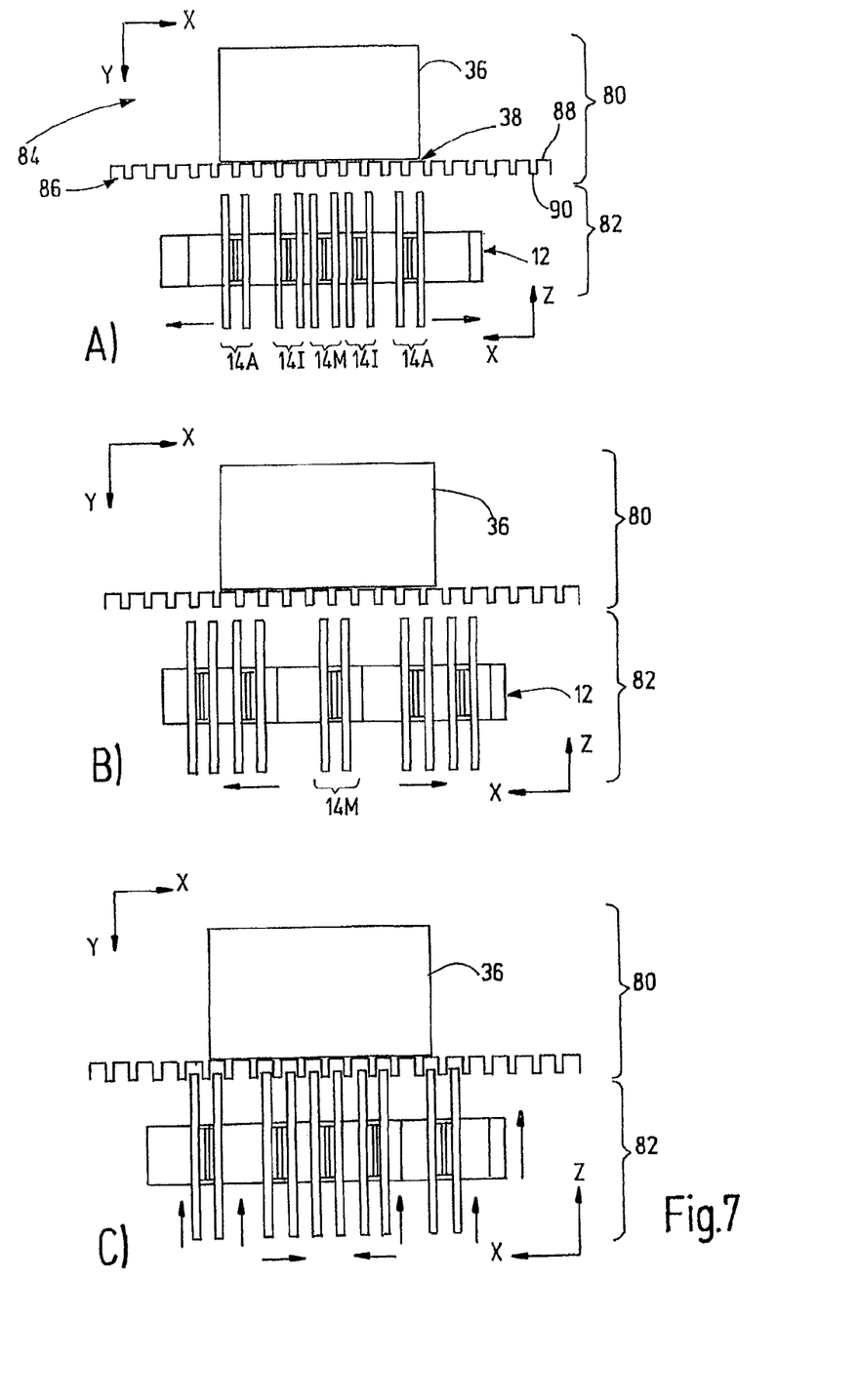
FIG. 7A-7C show a process, when pallet-loading goods are picked up by means of the load-handling device of the invention from a comb-shaped shelf of a storage rack.

With reference to FIGS. 7A-7C an exemplary pick-up process is shown in terms of sequential steps A)-C). The loading good 36 can stand on cardboard feet 38, which, however, are not required necessarily and will be further considered as "palletless". The loading good 36 is located at a transfer space 84, for example, in a rack-storage space having a comb-shaped shelf 86. The shelf 86 comprises valleys 88 and mountains 90. The loading good 36 rests on the mountains 90.

In FIGS. 7A-7C the upper part 80 of the figures represents a side view of the transfer space 84. A lower part 82 represents a top view of the LHD 10.

FIG. 7A illustrates how the outer prongs 14A, which are driven by one common width-adjustment drive 24 (not shown), are moved outwardly in the longitudinal direction X. The industrial truck was positioned previously in front of the rack compartment in the directions X and Y. Position values for the prongs 14A can be recorded in the stored-program controller of the industrial truck for each warehouse grid point ("footprint") which is possible.

Then, the inner prongs 14I can be moved outwardly in the longitudinal direction X, as shown in FIG. 7B. The central prong 14M is rigid, i.e. cannot be moved in the direction X. It is clear that the description of FIGS. 7A-7C assumes that the prongs 14 are originally retracted, i.e. have a minimal distance to each other in the longitudinal direction X. The prongs 14 can also be positioned, of course, differently in the starting position. FIG. 7C shows how the inner prongs 14I are moved towards the central prong 14M in the longitudinal direction X.

As soon as the prongs 14 are positioned such that they are arranged oppositely to the valleys 88 in the shelf 86, the longitudinal support 12 and/or the prongs 14 can be extended in the direction Z. As soon as the prongs 14 have been extended sufficiently far beneath the loading good 36 a lifting movement can be conducted by means of the hoist unit of the storage and retrieval device, in order to lift the loading good 36, i.e. to separate same from the shelf 86. As soon as the prongs 14 have been lifted from the valleys 88, the prongs 14 and the longitudinal support 12 can be retracted into their center position again, as shown in FIGS. 3C and 3D, since the loading good 36 is positioned on the prongs 14 in this case.

During delivery of one of the loading goods 36 to a transfer space 84 the load-handling device 10 gets positioned firstly in the directions X and Y. Subsequently, the longitudinal support 12 and the prongs 14 are extended. Preferably, the linear conveyors 18 are also moved, in particular oppositely to the movement of the longitudinal support 12 and the prongs 14. It is clear that the prongs 14 are positioned so that they can travel into the valleys 88 of the shelf 86. The height of the loading good 36, i.e. the position of the LHD 10 in the direction Y, which was travelled-to in the first step, is then selected such that the loading good 36 does not collide with the mountains 90 of the shelf 86 while the prongs 14 and the longitudinal support 12 are extended.

As soon as the loading good 36 is completely extended, a lowering movement can be initiated by means of the hoist unit for depositing the loading good 36 on the mountains 90 of the shelf 86. As soon as the loading good 36 sits on the shelf 86, the lowering movement can be terminated and the prongs 14 as well as the longitudinal support 12 can be retracted. As soon as the prongs 14 have left the shelf 86 in the direction Z, the industrial truck can continue to travel in the directions X and Y.

The transfer spaces 84, and in particular the rack-storage compartments, are divided into virtual compartment depths (in direction Z). In this context the smallest loading depth determines the compartment grid and a maximal coordinate in Z. In this way, for example, loading goods 36 having a loading depth of 400 to 1000 mm can be handled. At a minimal loading depth of 400 mm the storage compartment would provide space sufficient for three loading goods one behind the other. However, a loading good having a width of 400 mm can be put maximally in the depth direction by means of the LHD 10, since otherwise an overhang would become too big and the load would tilt (cf. FIGS. 6A and 6B). Hence, a compartment grid of, for example, 225 mm can result (=0.5× loading width+0.5×distance).

The overhang 78 should be considered during calculation of position values of the prongs 14. Generally the following applies:

Overhang=[Z(system)+0.5×loading width]−[Z(prong system)+0.5×prong length]

The allowable maximal overhang 78 is footprint-specifically defined and depends on a tilting risk and foot-surface pressure. The overhang can depend additionally on the width of the load and an extension path.

All statements above are given under the assumption of the exemplary constraint that a pallet width (or depth) is between 400 and 1200 mm. The overhang should be greater than 50 mm so that the prongs 14, during storage, do not form an edge disturbing a through-push securing or adjacent loads. It is important for the control of the linear-conveyor drive 26 that, during a positioning process of the overall system, the overhang 78 of the loading good 36 never gets greater than a predetermined maximum since otherwise there is the danger that the loading good 36 crashes.

Figure 8:
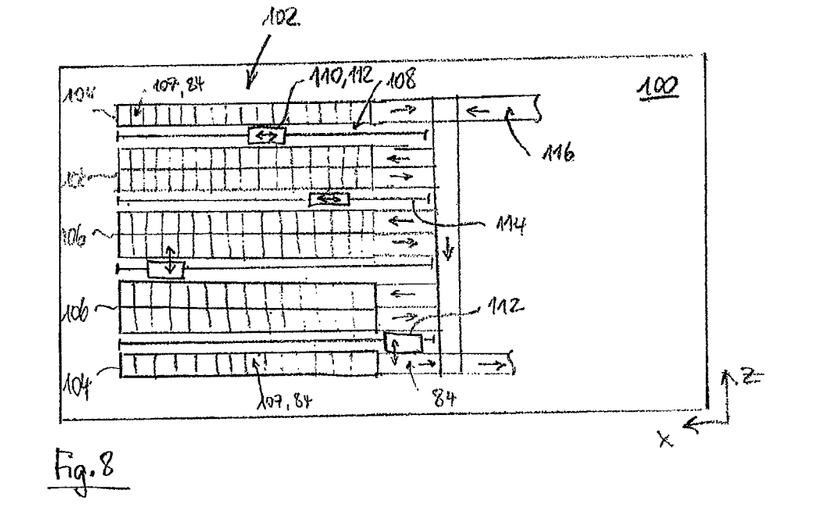
FIG. 8 shows a top view of a warehouse system 100 utilizing the load-handling device of the invention.

In FIG. 8 a warehouse system 100 having a rack warehouse 102 is shown. The rack warehouse 102 comprises single racks 104 and double racks 106. The double racks 106 comprise two single racks 104, which are arranged back-to-back. The racks 104 and 106 respectively comprise a plurality of rack-storage spaces 107 (transfer spaces 84), which are arranged horizontally side by side and vertically on top of each other.

Rack aisles 108 are located between the racks 104 and 106, wherein one or more industrial trucks 110 can travel in the rack aisles 108. In the present case, storage and retrieval devices 112, which can travel horizontally in a rail-guided manner, implement the industrial trucks 110. The storage and retrieval devices 112 comprise one or more masts, wherein a lifting unit can vertically travel along the one or more masts. The lifting unit comprises a lifting platform or lifting carriage 35, wherein the LHD 10 of the invention is mounted thereto. The LHD 10 can exchange loading goods 36 in the transverse direction (direction Z) with the transfer spaces 84, as indicated in FIG. 8 by means of arrows.

The rack warehouse 102 is connected to a conveyor system 116 (roller conveyor, belt conveyor, apron conveyor, lamella conveyor, etc.). The conveyor system 116 is arranged, for example, adjacent to front faces of the racks 104 and 106. Rails 114 of the storage and retrieval devices 112 are arranged so that regions are present overlapping with the conveyor system 116 for allowing exchange of loading goods 36 also between the storage and retrieval device 112 and the conveyor system 116.

Figure 9:
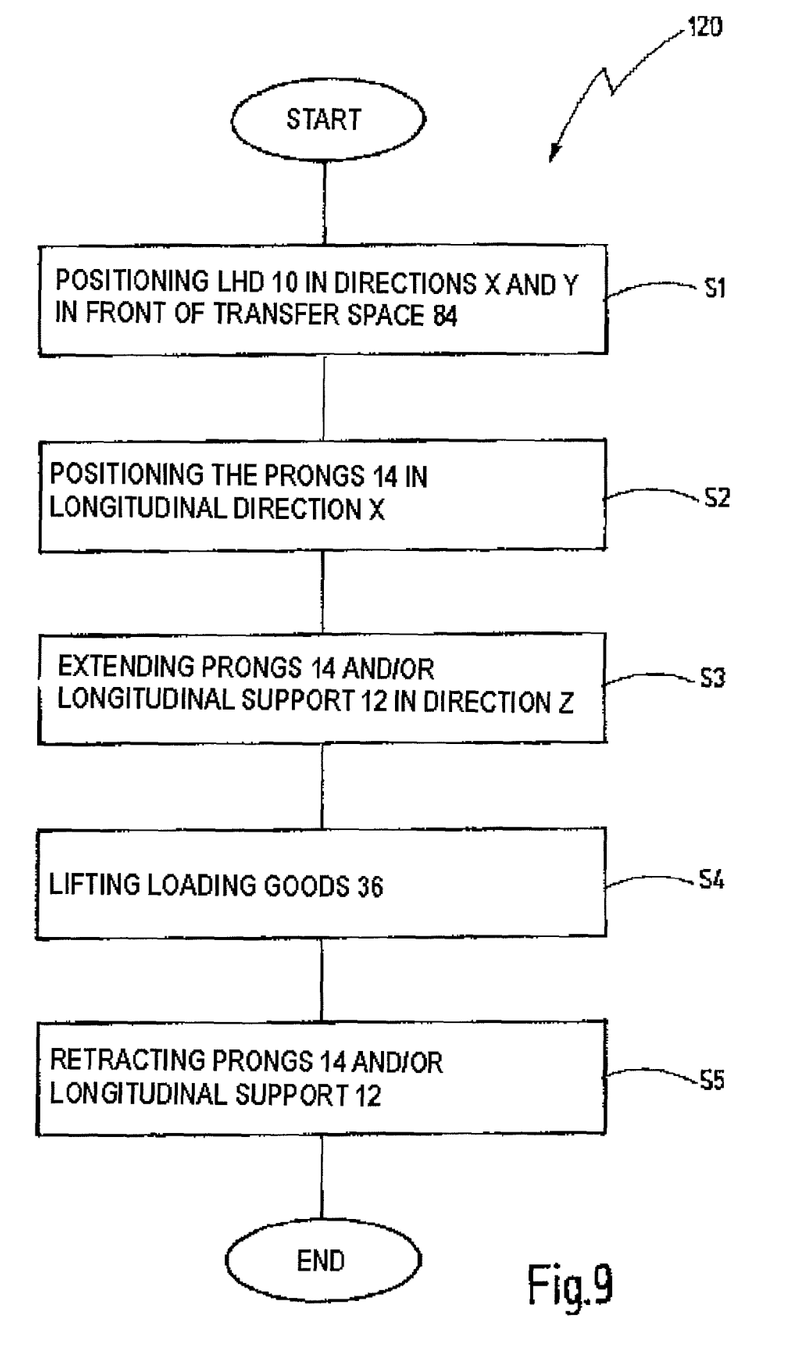
FIG. 9 shows a flow chart of the method in accordance with the invention.

FIG. 9 describes a process 120, wherein one loading good 36 is picked up from a transfer space 84 by means of the universal load-handling device 10 of the invention during the process 120.

In a step S1 the load-handling device 10 is positioned in the directions X and Y in front of the transfer space 84, i.e. it is orientated. In a step S2 the prongs 14 are positioned relative to each other in the longitudinal direction X, namely by means of the width-adjustment drive 24. In a step S3 the prongs 14 and/or the longitudinal carrier 12 is extended in the direction Z, in order to reach beneath the loading good 36. In a step S4 the loading good 36 is (vertically) lifted, in order to physically separate it from the transfer space 84. In a step S5 the prongs 14 and/or the longitudinal support 12 is/are retracted in the direction Z, allowing the industrial truck 110, or the LHD 10, to travel horizontally or vertically.

In the description of the invention above identical parts and features have been provided with identical reference numerals, wherein the disclosure contained in the entire description can be transferred to identical parts and features having identical reference numerals. Position and orientation information such as above, beneath, laterally, longitudinally, transversally, etc., refers to the immediately described figure and is to be transferred roughly to a new position and orientation in case of a change of the position and orientation.

I claim:

1. A universal load-handling device to be used with an industrial truck having a hoist unit and a lifting carriage for picking up and delivering loading goods, which are to be loaded on a pallet, from a transfer space or to the transfer space, wherein the loading goods are heavy and wherein the loading goods are lowered to the transfer space or lifted from the transfer space by means of the hoist unit of the industrial truck for storage or retrieval purposes, the load-handling device comprising:
   a longitudinal-support drive;
   a longitudinal support, which is substantially oriented in a longitudinal direction and which is fixed to the lifting carriage of the industrial truck in a transversally displaceable manner by means of the longitudinal-support drive;
   a prong drive;
   a plurality of prongs, wherein each of the prongs is substantially oriented in a transverse direction and supported on the longitudinal support in a transversally displaceable manner by means of the prong drive, in order to extend and retract the prongs in the transverse direction relative to the longitudinal support;
   a linear-conveyor drive; and
   a plurality of linear conveyors which are substantially oriented in the transverse direction, wherein respectively one of the linear conveyors is assigned to one of the prongs, wherein the linear conveyors are moved by means of the linear-conveyor drive, and wherein the linear conveyors are configured to protrude vertically across the prongs, in order to carry the loading goods on the linear conveyors and to move the loading goods in the transverse direction relative to the prongs;
   wherein the prongs are supported on the longitudinal support in the longitudinal direction by means of a width-adjustment drive in a manner so that they are displaceable longitudinally to each other;
   wherein each of the linear conveyors comprises a closed traction device running in an endless manner around one of the prongs by means of idler pulleys, which are respectively supported in the one of the prongs, and which mechanically couples the linear conveyor to the one of the prongs such that the traction device is moved dun retraction or extension of the one of the prongs.

2. The load-handling device of claim 1, further comprising linear-guiding devices, wherein the longitudinal support is configured to substantially extend over an entire length of the lifting carriage and to move along the linear-guiding devices on the lifting carriage.

3. The load-handling device of claim 2, wherein the linear-guiding devices are rails.

4. The load-handling device of claim 1, wherein the prongs are configured to be movable to each other in the longitudinal direction such that the prongs are moveable to any arbitrary point beneath the loading goods, which are provided for being picked-up or delivered.

5. The load-handling device of claim 1, wherein the prongs are provided in pairs.

6. The load-handling device of claim 1, wherein the linear-conveyor drive comprises a drive unit and a drive shaft, wherein the drive shaft is supported in the longitudinal support.

7. The load-handling device of claim 1, wherein a prong-drive shaft of the prong drive is supported in the longitudinal support.

8. The load-handling device of claim 7, wherein the prong drive comprises a gear, which sits on the prong-drive shaft supported in the longitudinal support, and meshes with a gear-tooth profile provided at a bottom side of each of the prongs.

9. A universal load-handling device to be used with an industrial truck having a hoist unit and a lifting carriage for picking up and delivering loading goods, which are to be loaded on a pallet, from a transfer space or to the transfer space, wherein the loading goods are heavy and wherein the loading goods are lowered to the transfer space or lifted from the transfer space by means of the hoist unit of the industrial truck for storage or retrieval purposes, the load-handling device comprising:
   a longitudinal-support drive;
   a longitudinal support, which is substantially oriented in a longitudinal direction and which is fixed to the lifting carriage of the industrial truck in a transversally displaceable manner by means of the longitudinal-support drive;
   a prong drive;
   a plurality of prongs, wherein each of the prongs is substantially oriented in a transverse direction and supported on the longitudinal support in a transversally displaceable manner by means of the prong drive, in order to extend and retract the prongs in the transverse direction relative to the longitudinal support;
   a linear-conveyor drive; and
   a plurality of linear conveyors which are substantially oriented in the transverse direction, wherein respectively one of the linear conveyors is assigned to one of the prongs, wherein the linear conveyors are moved by means of the linear-conveyor drive, and wherein the linear conveyors are configured to protrude vertically across the prongs, in order to carry the loading goods on the linear conveyors and to move the loading goods in the transverse direction relative to the prongs;
   wherein the prongs are supported on the longitudinal support in the longitudinal direction by means of a width-adjustment drive in a manner so that they are displaceable longitudinally to each other;
   wherein a centrally arranged prong is mounted rigidly to the longitudinal support in the longitudinal direction, and wherein outwardly adjacent prongs are displaceable in pairs along the longitudinal direction in a symmetric manner relative to the centrally arranged prong by means of respectively one common width-adjustment drive, wherein prong pairs, which are correspondingly displaceable, are coupled to each other by means of a spindle so that the prong pairs are guided along a respective one of the spindles.

10. A storage and retrieval device having a hoist unit and a lifting carriage, wherein a load-handling device is mounted on the lifting carriage, the load-handling device comprising: a longitudinal-support drive; a longitudinal support, which is substantially oriented in a longitudinal direction and which is fixed to the lifting carriage of the industrial truck in a transversally displaceable manner by means of the longitudinal-support drive; a prong drive; a plurality of prongs, wherein each of the prongs is substantially oriented in a transverse direction and supported on the longitudinal support in a transversally displaceable manner by means of the prong drive, in order to extend and retract the prongs in the transverse direction relative to the longitudinal support; a linear-conveyor drive; and a plurality of linear conveyors which are substantially oriented in the transverse direction, wherein respectively one of the linear conveyors is assigned to one of the prongs, wherein the linear conveyors are moved by means of the linear-conveyor drive, and wherein the linear conveyors are configured to protrude vertically across the prongs, in order to carry the loading goods on the linear conveyors and to move the loading goods in the transverse direction relative to the prongs; wherein the prongs are supported on the longitudinal support in the longitudinal direction by means of a width-adjustment drive in a manner so that they are displaceable longitudinally to each other;

wherein each of the linear conveyors comprises a closed traction device running in an endless manner around one of the prongs by means of idler pulleys, which are respectively surpported in the one of the prongs and which mechanically couples the linear conveyor to the one of the prongs such that the traction device is moved during retraction or extension of the one of the prongs.

11. A warehouse system having a rack, a storage and retrieval device, and a conveyor, wherein the storage and retrieval device is movable in a longitudinal direction along the rack in horizontal and vertical directions for exchanging pallet-loading goods in a palletless manner between rack-storage spaces and the conveyor, which is arranged adjacent to the rack, wherein the storage and retrieval device has a load-handling device comprising: a longitudinal-support drive; a longitudinal support, which is substantially oriented in a longitudinal direction and which is fixed to the lifting carriage of the industrial truck in a transversally displaceable manner by means of the longitudinal-support drive; a prong drive; a plurality of prongs, wherein each of the prongs is substantially oriented in a transverse direction and supported on the longitudinal support in a transversally displaceable manner by means of the prong drive, in order to extend and retract the prongs in the transverse direction relative to the longitudinal support; a linear-conveyor drive; and a plurality of linear conveyors which are substantially oriented in the transverse direction, wherein respectively one of the linear conveyors is assigned to one of the prongs, wherein the linear conveyors are moved by means of the linear-conveyor drive, and wherein the linear conveyors are configured to protrude vertically across the prongs, in order to carry the loading goods on the linear conveyors and to move the loading goods in the transverse direction relative to the prongs; wherein the prongs are supported on the longitudinal support in the longitudinal direction by means of a width-adjustment drive in a manner so that they are displaceable longitudinally to each other;

wherein each of the linear conveyors comprises a closed traction device running in an endless manner around one of the prongs by means of idler pulleys, which are respectively supported in the one of the prongs, and which mechanically couples the linear conveyor to the one of the prongs such that the traction device is moved during retraction or extension of the one of the prongs.

12. A method for palletlessly picking up loading goods, which are to be loaded on a pallet, from a transfer space by means of a universal load-handling device comprising: a longitudinal-support drive; a longitudinal support, which is substantially oriented in a longitudinal direction and which is fixed to a lifting carriage of an industrial truck in a transversally displaceable manner by means of the longitudinal-support drive; a prong drive; a plurality of prongs, wherein each of the prongs is substantially oriented in a transverse direction and supported on the longitudinal support in a transversally displaceable manner by means of the prong drive, in order to extend and retract the prongs in the transverse direction relative to the longitudinal support; a linear-conveyor drive; and a plurality of linear conveyors which are substantially oriented in the transverse direction, wherein respectively one of the linear conveyors is assigned to one of the prongs, wherein the linear conveyors are moved by means of the linear-conveyor drive, and wherein the linear conveyors are configured to protrude vertically across the prongs, in order to carry the loading goods on the linear conveyors and to move the loading goods in the transverse direction relative to the prongs; wherein the prongs are supported on the longitudinal support in the longitudinal direction by means of a width-adjustment drive in a manner so that they are displaceable longitudinally to each other, comprising the steps of:

positioning the load-handling device in the longitudinal direction and a height direction in front of a transfer space;

positioning the prongs in the longitudinal direction by means of a width-adjustment drive so that the prongs reach beneath a freely selectable point under the loading goods;

extending the longitudinal support and/or the prongs in a transverse direction until the loading goods are sufficiently supported;

moving the load-handling device in the height direction such that the loading goods are lifted from the transfer space; and retracting at least one of the longitudinal support and at least one prong or the longitudinal support and/or the prongs in the transverse direction until the loading goods are in a transport position; and wherein each of the linear conveyors comprises a closed traction device running in an endless manner around one of the prongs by means of idler pulleys, which are respectively supported in the one of the prongs, and which mechanically couples the linear conveyor to the one of the prongs such that the traction device is moved during retraction or extension of the one of the prongs.

13. The method of claim 12, wherein the linear conveyors are moved during retraction of the at least one of the longitudinal support and the prongs such that the loading goods move oppositely to the extension direction of the longitudinal support and prongs.

* * * * *